Patented June 7, 1927.

1,631,903

UNITED STATES PATENT OFFICE.

JOHANNES A. L. VAN DER LANDE, OF DEVENTER, NETHERLANDS, ASSIGNOR, BY MESNE ASSIGNMENTS, TO NOVADEL PROCESS CORPORATION, OF BUFFALO, NEW YORK, A CORPORATION OF NEW YORK.

STABLE PEROXIDIZED COMPOSITION AND PROCESS OF MAKING SAME.

No Drawing. Application filed May 3, 1826, Serial No. 106,486, and in the Netherlands October 18, 1924.

The object of the present invention is the production of dry stable mixtures containing peroxidized compounds in a form and condition adapted for use in improving flour, meal and other similar milling products, for bread-making and similar uses.

It is known to employ peroxidized compounds for improving such milling products, as for example U. S. Patent to Sutherland No. 1,539,701 and Reissue No. 16,116.

The properties of the peroxidized compounds, however, have introduced certain drawbacks to such use, among such properties being especially (a) the unstable character of many of them and (b) the hygroscopic properties of some of them.

As examples of peroxidized compounds which exhibit one or both of the above mentioned properties, are mentioned, by way of example, benzoyl peroxide peraldehydes, ozonides, ozonide-peroxides, oxozonides, oxozonide-peroxides, persulfates (e. g. potassium, sodium and ammonium) and other persalts, and peracids, crotonic acid peroxide, succinic acid peroxide, phthalic acid peroxide, acetyl benzoyl peroxide, dibenzaldiperoxide, sodium percarbonate, potassium perphosphate, cyclohexene ozonide, oleic acid ozonide-peroxide, and mixtures of two or more of these substances.

The organic peroxides, such as benzoyl peroxide have especially been applied both for bleaching flour and for improving its baking qualities, and ammonium persulphate has already been proposed, for addition to flour to strengthen the gluten and thereby improve the baking quality of the flour. The addition of both classes of these peroxidized compounds would thus seem to give a combination of their useful effects, and also it would be possible to add both simultaneously which would involve the use of a single mixing device for incorporating both with the flour, thereby effecting a saving in labor costs over adding them successively.

It was however found that the efficient use of such compounds and mixtures suffered, especially due to the unfavorable properties above noted. It was found out that certain of the inorganic compounds, notably ammonium persulphate, and mixtures containing the same, suffers considerably on protracted exposure to the atmosphere, with considerable loss of its active power, becoming moist and even pasty and also becoming partly decomposed (which latter action seems to be considerably hastened by the action of the absorbed moisture). Manifestly, it would be practically impossible to uniformly mix the pasty mass with the large amount of flour. This tendency to become moist and pasty, and the tendency to rapidly lose a considerable part of its active oxygen, is especially noticeable in the case of a mixture of ammonium persulphate and benzoyl peroxide, which mixture, but for these defects, would be a very suitable one for treating flour.

The present invention makes it possible to overcome these defects, and consists in adding a diluent material which, while being active in absorbing moisture, does not itself exert any decomposing action (in the sense of liberation of the active oxygen content) upon the peroxidized compounds, and by its own affinity for moisture, prevents absorption thereof by the peroxidized compound, prevents the mass from becoming moist or pasty and prevents, to a high degree, the decomposition (in the sense above stated) of the peroxidized compound. Thus the diluent, in the present invention acts both as a chemical and physical stabilizer for the peroxidized compounds.

These highly desirable effects are produced both in the case of a single peroxidized substance or a plurality thereof.

Among the diluent materials, may be mentioned especially sulphates, phosphates, lactates of the alkali and alkaline earth metals, in anhydrous or substantially anhydrous condition, or at least containing much less water than the air-stable forms (with water of crystallization).

Alkaline earth metal oxides, capable of combining with water to form hydroxides can also be employed in some cases, however not in the case ammonium persulphate is used. Mixtures of such substances can likewise be used. The process is accordingly a relatively simple one of thoroughly mixing the said peroxidized compounds (or mixtures thereof) with one or more of said diluent materials having the properties mentioned. It will be understood that by the mixing operation, any moisture in the peroxidized compounds (in some cases even including any water of crystallization that they may contain) will be greedily taken up by the more actively water-absorbing diluent materials, thereby leaving the peroxidized compound or compounds in a very finely powdered state, especially suitable for thorough mixing with the flour or other milling product.

On account of the unfavorable properties above referred to, a mixture of ammonium persulphate and benzoyl peroxide, when kept for some time, is found to have decomposed considerably, with a large loss in its active oxygen contents, probably due in part to the hyrolytic splitting up of the ammonium persulphate due to its hygroscopic properties, and absorption of water thereby. The substances to be used as diluents should have a strong hygroscopic property, but should not themselves be or become deliquescent, otherwise they would aggravate (instead of overcoming) the somewhat deliquescent properties of some of the peroxidized compounds. Free sulphuric acid is formed by such splitting, and sulphuric acid even in a very minute quantity acts strongly to decompose the benzoylperoxide, so that in the case of mixtures of inorganic persalts such as persuphates, with organic peroxidized compounds, a very great deal of decomposition and loss of active oxygen may occur.

The following examples are given, for the purpose of illustration, and not as restricting the invention thereto.

Example 1.

1 part by weight of benzoyl peroxide is mixed with three parts by weight of dry bi-calcium phosphate (anhydrous), and 1 part by weight of ammonium persulphate. The mixture is reduced by grinding to a relatively fine powder, and can be kept a considerable period, even exposed to the atmosphere, without any substantial loss of active oxygen.

Example 2.

1 part by weight of anhydrous calcium sulphate (gypsum heated to drive out all or substantially all of its water of crystallization) is mixed with one part by weight of ammonium persulphate and 1 part by weight of benzoyl peroxide. The above mixture is treated as above.

The products of these operations can be subsequently added to flour or milling products which it is desired to bleach and improve.

Without limiting the present invention thereto, it is stated that the amount of the mixture to be added to flour, can vary considerably. Amounts of the mixtures containing for example 1 to 30 grams (more or less) of active oxygen can be added, per 100 kilos of flour, producing satisfactory results.

What is claimed as new, is:—

1. A mode of overcoming the hygroscopic tendency of peroxidized compounds used for treating edible milling products and of increasing the stability thereof which comprises intimately incorporating the peroxidized compounds with a dry stable non-deliquescent solid material capable of absorbing considerable quantities of moisture without becoming wet and pasty and which in small quantities is non-poisonous to human beings, such incorporation being performed in the absence of flour in amount equal to many times as much as the amounts of said chemicals.

2. A mode of overcoming the hygroscopic tendency of persulfates and of increasing the stability thereof which comprises intimately incorporating the persulfate with a dry stable salt which in small quantities is non-poisonous to human beings, and which is capable of absorbing considerable moisture without becoming wet or pasty, all without incorporating, at that time, with large quantities of flour.

3. A mode of overcoming the hygroscopic tendency of persulfates and mixtures containing the same and of increasing the stability thereof which comprises intimately incorporating the same with calcium sulfate containing less water than gypsum, which is capable of absorbing moisture.

4. A mode of overcoming the hygroscopic tendency of peroxidized compounds suitable for treating flour and of increasing the stability thereof which comprises intimately incorporating the peroxidized compounds with a dry stable non-deliquescent solid material which in small quantities is non-poisonous to human beings, and which is capable of absorbing a considerable amount of moisture without becoming wet and pasty, all without incorporating, at that time with large amounts of flour.

5. An intimate mixture consisting essentially of a pulverulent persulfate and another substance, such latter being one that is capable of absorbing a considerable amount of water without becoming wet, damp or mushy to the feel, and which is initially in a substantially anhydrous condition and which in small amounts is free from toxic action on the human digestive system, such mixture being non-hygroscopic and stable, such mixture being free from large amounts of flour.

6. An intimate mixture of a substantially dry persulfate and substantially dry calcium sulfate.

7. A mixture containing a persalt and an organic peroxidized compound together with a chemically inert carrier medium, the latter being initially substantially anhydrous and capable of absorbing considerable amounts of water without becoming substantially damp or pasty, such mixture being substantially free from flour and in small amounts, when subsequently mixed with large quantities of flour being non-injurious to the human digestive system.

8. A mixture containing a normally hygroscopic persalt and an organic peroxidized compound together with a chemically inert carrier medium, the latter being initially substantially anhydrous and capable of absorbing considerable amounts of water without becoming substantially damp or pasty, such mixture, in small amounts when mixed with large quantities of flour, being non-injurious to the human digestive system.

9. A mixture containing a persulphate and an organic peroxidized compound together with a chemically inert carrier medium, the latter being initially substantially anhydrous and capable of absorbing considerable amounts of water without becoming substantially damp or pasty, such mixture, in small amounts when mixed with large quantities of flour, being non-injurious to the human digestive system.

In testimony whereof I affix my signature.

JOHANNES A. L. VAN DER LANDE.